United States Patent
Cormier et al.

(10) Patent No.: US 8,184,637 B2
(45) Date of Patent: May 22, 2012

(54) METHOD, SYSTEM AND APPARATUS FOR DYNAMIC QUALITY OF SERVICE MODIFICATION

(75) Inventors: Jean-Philippe Cormier, Ottawa (CA); Thomas Leonard Trevor Plestid, Ottawa (CA); Muhammad Khaledul Islam, Ottawa (CA)

(73) Assignee: Research In Motion Limited, Waterloo (CA)

( * ) Notice: Subject to any disclaimer, the term of this patent is extended or adjusted under 35 U.S.C. 154(b) by 898 days.

(21) Appl. No.: 11/732,565

(22) Filed: Apr. 4, 2007

(65) Prior Publication Data

US 2008/0247326 A1  Oct. 9, 2008

(51) Int. Cl.
*H04L 12/28* (2006.01)
(52) U.S. Cl. ............... 370/395.21; 370/252; 370/395.41
(58) Field of Classification Search .................. None
See application file for complete search history.

(56) References Cited

U.S. PATENT DOCUMENTS

| | | | | |
|---|---|---|---|---|
| 5,674,003 | A * | 10/1997 | Andersen et al. ............ | 709/228 |
| 6,968,374 | B2 * | 11/2005 | Lemieux et al. ............ | 709/223 |
| 7,542,471 | B2 * | 6/2009 | Samuels et al. ............ | 370/392 |
| 2003/0112766 | A1 * | 6/2003 | Riedel et al. ................ | 370/252 |
| 2004/0105415 | A1 * | 6/2004 | Fujiwara et al. ............ | 370/338 |
| 2004/0218607 | A1 * | 11/2004 | Hurtta et al. ............ | 370/395.21 |
| 2005/0128963 | A1 * | 6/2005 | Gazda et al. ................ | 370/278 |
| 2005/0163079 | A1 * | 7/2005 | Taniuchi et al. ............ | 370/331 |
| 2005/0190782 | A1 * | 9/2005 | Buckley et al. ............ | 370/437 |
| 2006/0005008 | A1 * | 1/2006 | Kao ........................... | 713/153 |
| 2006/0218302 | A1 * | 9/2006 | Chia et al. ................... | 709/245 |
| 2007/0025359 | A1 * | 2/2007 | Andriantsiferana et al. ........................ | 370/395.21 |
| 2007/0180073 | A1 * | 8/2007 | Paul et al. ................... | 709/220 |
| 2007/0268841 | A1 * | 11/2007 | Dube et al. ................. | 370/254 |
| 2008/0049755 | A1 * | 2/2008 | Gannon et al. ............ | 370/395.1 |
| 2008/0132268 | A1 * | 6/2008 | Choi-Grogan et al. .... | 455/550.1 |
| 2008/0137541 | A1 * | 6/2008 | Agarwal et al. ............ | 370/241 |
| 2008/0225708 | A1 * | 9/2008 | Lange ......................... | 370/230 |

FOREIGN PATENT DOCUMENTS

| | | |
|---|---|---|
| EP | 1 619 917 A1 | 1/2006 |
| WO | WO 03/071813 A2 | 8/2003 |
| WO | WO 2006/130959 | 12/2006 |

OTHER PUBLICATIONS

EPO Examination Report in EP Application No. 07105680.8; European Patent Office; Jul. 10, 2008; 6 pages.
European Search Report; European Patent Office; Jul. 27, 2007; 7 pages.
CA Office Action, Application No. 2,628,326, Canadian IPO, Mar. 14, 2011, 3 pgs.

* cited by examiner

*Primary Examiner* — Huy Vu
*Assistant Examiner* — Zewdu A Beyen
(74) *Attorney, Agent, or Firm* — The Danamraj Law Group, P.C.

(57) ABSTRACT

A method, system and apparatus for dynamically modifying the quality of service provided to a mobile communication device. The method includes the steps of establishing a secure tunnel between the mobile communication device and a remote network through a wireless network; communicating through the secure tunnel at a first quality of service; determining that a second quality of service, higher or lower than the first quality of service, is more appropriate to the communication type, and requesting, from the wireless network, the second quality of service.

16 Claims, 7 Drawing Sheets

METHOD, SYSTEM AND APPARATUS FOR DYNAMIC QUALITY OF SERVICE MODIFICATION

TECHNICAL FIELD OF THE APPLICATION

The present disclosure generally relates to wireless packet data service networks. More particularly, and not by way of any limitation, the present disclosure is directed to a mobile communication device and related data service network capable of updating the quality of service provided to the mobile communication device as required.

BACKGROUND

The present disclosure is directed toward efficient utilization of wireless resources for communication between a network and a mobile communication device. The resources available for wireless communication are necessarily limited. It is, therefore, desirable to provide only the resources required for a given communication in order to conserve and optimize available bandwidth. To this end, certain wireless messaging networks provide for a default quality of service (QoS). Although this default quality of service is generally suitable for certain types of communications, it may not be suitable for other types of communication.

BRIEF DESCRIPTION OF THE DRAWINGS

A more complete understanding of the embodiments of the present disclosure may be had by reference to the following Detailed Description when taken in conjunction with the accompanying drawings wherein.

DETAILED DESCRIPTION OF THE DRAWINGS

Figure 1A:
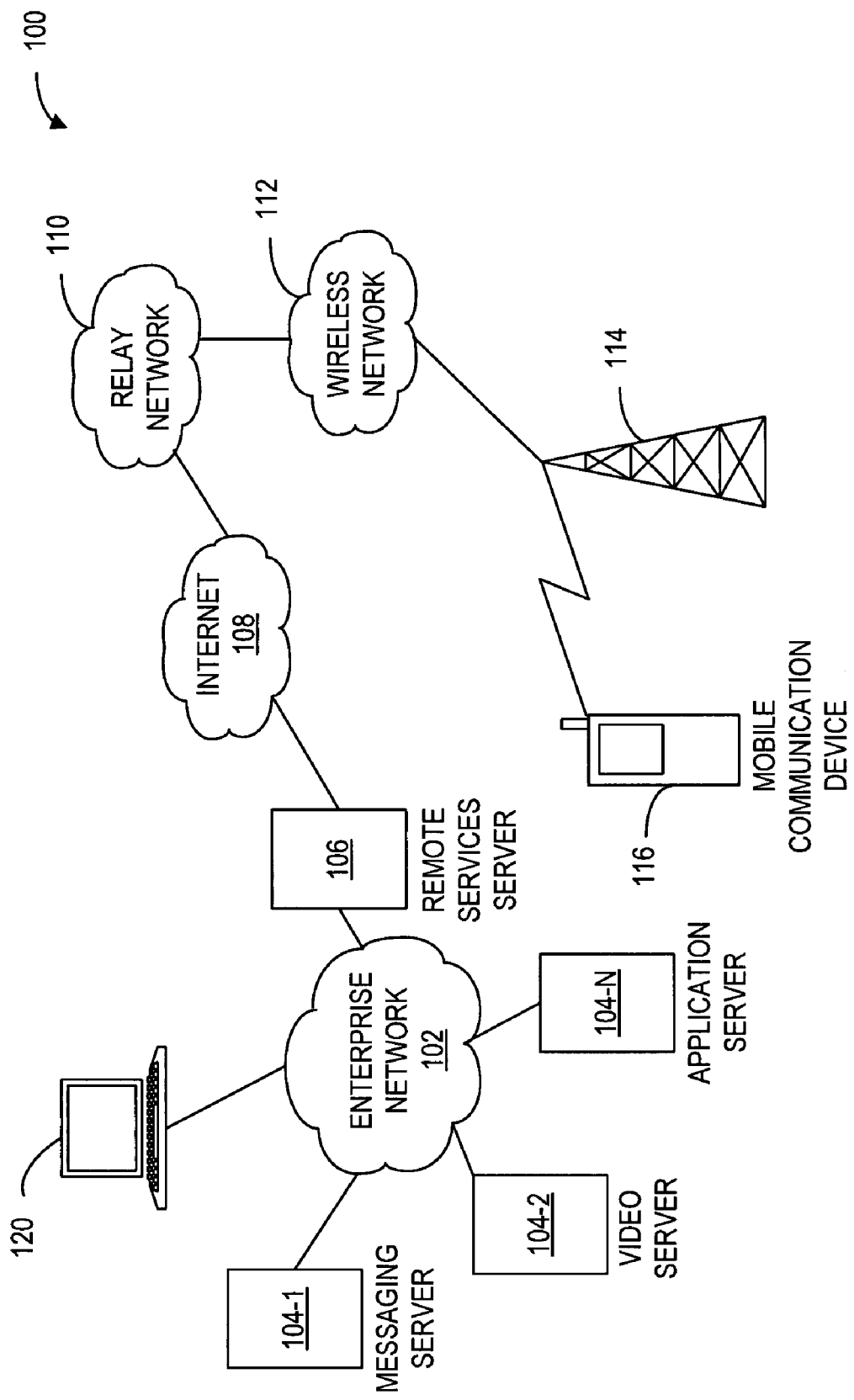
FIG. 1A depicts an exemplary network environment including a wireless packet data service network wherein an embodiment of the present disclosure may be practiced.

A system and method of the present disclosure will now be described with reference to various examples of how the embodiments can best be made and used. Identical reference numerals are used throughout the description and several views of the drawings to indicate identical or corresponding parts, wherein the various elements are not necessarily drawn to scale.

The present disclosure relates to a device, method and system for dynamically modifying a quality of service level within a wireless packet data service network. According to a first aspect, the present disclosure relates to a mobile communication device. The mobile communication device includes a secure channel driver operable to establish a secure channel between the mobile communication device and a remote network via a wireless network, the secure channel operating to support an end-to-end secure tunnel; a first client application operable to communicate with a first server application via the secure tunnel and associated with a first quality of service; a second client application operable to communicate with a second server application via the secure tunnel and associated with a second quality of service different from the first quality of service; a quality of service monitor operable to identify when the second quality of service is appropriate; and a quality of service modification module operable to request the second quality of service from the wireless network when the second quality of service is appropriate.

In certain embodiments, the first client application is one of a messaging client application, a contacts management client application, a calendar management application or a browser application. In certain embodiments, the second application is one of a streaming audio client, a streaming video client, a VoIP client or an FTP client. In certain embodiments, the wireless network is a GSM network or others such as an Enhanced Data Rates for GSM Evolution (EDGE) network, an Integrated Digital Enhanced Network (IDEN), a Universal Mobile Telephone System (UMTS) network, a Code Division Multiple Access (CDMA) network, or any 3rd Generation (3G) network. In certain embodiments, the quality of service monitor is further operable to identify when the second quality of service is not appropriate. In certain embodiments, the service modification module is operable to request the first quality of service from the wireless network when the second quality of service is not appropriate. In certain embodiments, the quality of service monitor and quality of service module comprise a portion of a transport stack within the mobile communication device.

According to a second aspect, the present disclosure relates to a method of dynamically modifying the quality of service provided to a mobile communication device. The method includes the steps of communicating at a first quality of service through a secure tunnel established between the mobile communication device and a remote network through a wireless network; determining that a second quality of service, different from the first quality of service, is appropriate; and requesting, from a network node associated with the wireless network, the second quality of service.

According to a third aspect, the present disclosure relates to a communications node. The communications node includes means for supporting communication between a mobile communication device and a remote network via a secure tunnel across a wireless network having at least a first quality of service and a second quality of service; means for processing a request from the mobile communication device to change the quality of service from the first quality of service to the second quality of service; and means for changing the quality of service according to the request received from the mobile communication device.

Referring now to the drawings, and more particularly to FIG. 1A, depicted therein is an exemplary network environment 100 including a wireless packet data service network 112 wherein an embodiment of the present system may be practiced. An enterprise network 102, which may be a packet-switched network, can include one or more geographic sites and be organized as a local area network (LAN), wide area network (WAN) or metropolitan area network (MAN), et cetera, for serving a plurality of corporate users.

A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. In particular, application server 104-1 is a messaging server and 104-2 is a streaming video server. Accordingly, a diverse array of personal information appliances such as desktop computers, laptop computers, palmtop computers, et cetera, although not specifically shown in FIG. 1A, may be operably networked to one or more of the application servers 104-$i$, i=1, 2, ..., N, with respect to the services supported in the enterprise network 102.

Additionally, a remote services server 106 may be interfaced with the enterprise network 102 for enabling a corporate user to access or effectuate any of the services from a remote location using a suitable mobile communication device 116. Mobile communication device 116 may be any communications device capable of communicating via wireless means including but not limited to a cellular telephone, a wireless personal digital assistant, a wireless pager or a wireless enabled laptop computer, as examples. By way of example, mobile communication device 116 may be a data-enabled handheld device capable of receiving and sending messages, web browsing, interfacing with corporate application servers, et cetera. A secure communication link with end-to-end encryption may be established that is mediated through an external IP network, i.e., a public packet-switched network such as the Internet 108, as well as the wireless packet data service network 112 operable with mobile communication device 116 via suitable wireless network infrastructure that includes a base station (BS) 114. In one embodiment, a trusted relay network 110 may be disposed between the Internet 108 and the infrastructure of wireless packet data service network 112.

For purposes of the present disclosure, the wireless packet data service network 112 may be implemented in any known or heretofore unknown mobile communications technologies and network protocols. For instance, the wireless packet-data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Universal Mobile Telephone System (UMTS) network, a Code Division Multiple Access (CDMA) network, or any 3rd Generation (3G) network. By way of providing an exemplary embodiment, the teachings of the present disclosure will be illustrated with a GPRS-based carrier network, although those skilled in the art should readily recognize that the scope of the present disclosure is not limited thereby.

Figure 1B:
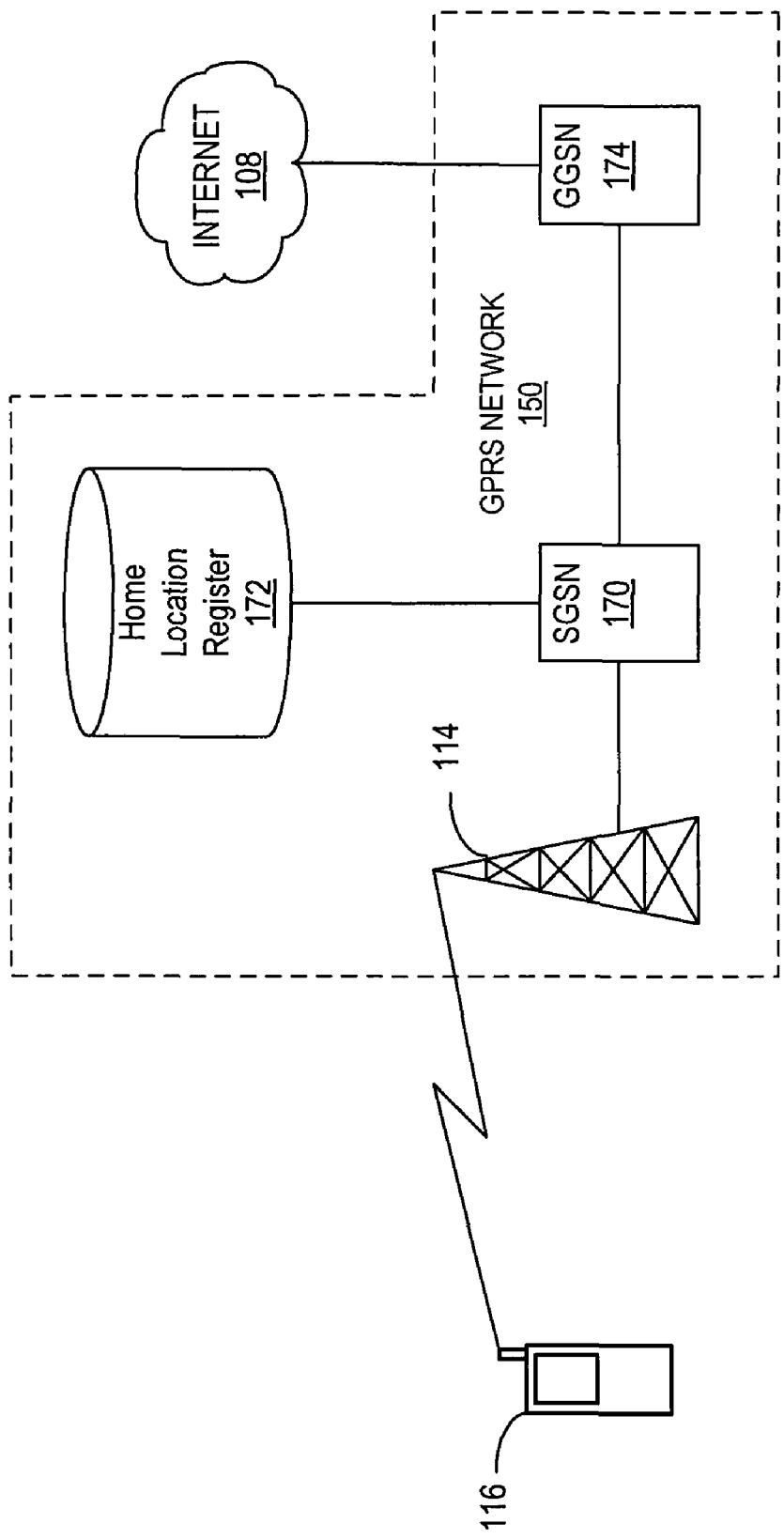
FIG. 1B depicts an exemplary network environment including a wireless packet data service network wherein an embodiment of the present disclosure may be practiced.

FIG. 1B depicts additional details of an exemplary wireless service network operable with a mobile communication device in accordance with one embodiment. As illustrated, reference numeral 150 refers to a GPRS network operable as the wireless packet data service network with respect to mobile communication device 116. As noted above, base station 114 serves mobile communication device 116 via the air interface using applicable radio layer protocols.

It is well-known that GPRS uses a packet-switching technique to transfer both high-speed and low-speed data and signaling in an efficient manner over GSM radio networks. Packet switching means that GPRS radio resources are used only when users are actually sending or receiving data. Rather than dedicating a radio channel to a mobile data user, e.g., mobile communication device 116, for a fixed period of time, the available radio channels can be concurrently shared between several users. Therefore, GPRS is designed to support from intermittent and bursty data transfers (e.g., web browsing) to occasional transmission of large volumes of data (e.g., File Transfer Protocol (FTP) communications). Allocation of GPRS radio channels can be flexible: from 1 to 8 radio interface timeslots can be allocated per one Time Division Multiple Access (TDMA) frame. Typically, timeslots are shared by the active users, and uplinks and downlinks are allocated separately. Various radio channel coding schemes are available to allow a range of data bit transfer rates.

Two additional network nodes are provided within a GSM network in order to implement a packet-switched data transfer service. A Serving GPRS Support Node (SGSN) 170, which is coupled to a Home Location Register (HLR) 172 and disposed at the same hierarchical level as a Mobile Switching Center (MSC) of the circuit-switched cellular network (not shown), is operably coupled to base station 114 and keeps track of the location of a GPRS user such as the user of mobile communication device 116. Further, SGSN 170 is responsible for performing security functions and handling access control with respect to mobile communication device 116. A Gateway GPRS Support Node (GGSN) 174 provides interworking with the internet 108, and is operably coupled to one or more SGSNs, e.g., SGSN 170, via an IP-based GPRS backbone network.

In order to access the packet data service, mobile communication device 116 makes its presence known to the network by performing what is known as a GPRS Attach. Thereafter, to send and receive packet data, mobile communication device 116 activates the packet data address that it wants to use. This operation renders mobile communication device 116 "visible" in the corresponding GGSN, and interworking with external data networks can then begin. User data is transferred transparently between mobile communication device 116 and the external data networks with a method known as encapsulation and tunneling wherein data packets are equipped with GPRS-specific protocol information and transferred transparently between mobile communication device 116 and GGSN 174.

Figure 2:
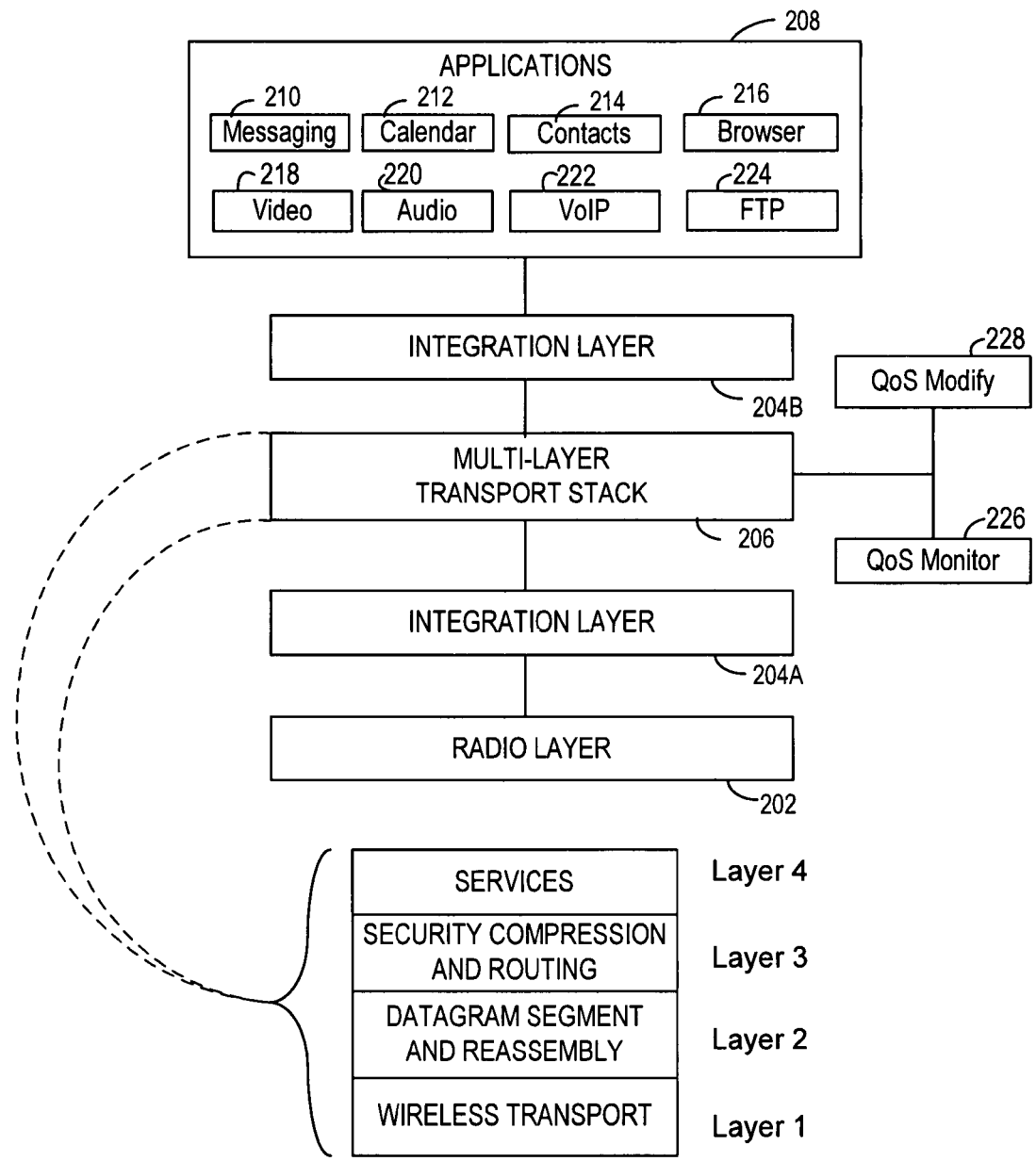
FIG. 2 depicts a software architectural view of a mobile communication device operable to communicate within a wireless packet data service network according to one embodiment.

FIG. 2 depicts a software architectural view of a mobile communication device according to one embodiment. A multi-layer transport stack (TS) 206 is operable to provide a generic data transport protocol for any type of corporate data, including email, via a reliable, secure and seamless continuous connection to a wireless packet data service network. As illustrated in this embodiment, an integration layer 204A is operable as an interface between a radio layer 202 and the transport stack 206 of mobile communication device 116.

A second integration layer 204B is provided for interfacing between the transport stack 206 and a number of user applications 208 supported on mobile communication device 116, which include messaging client 210, calendar/scheduler client 212, contacts management client 214, browser 216, streaming video client 218, streaming audio client 220, VoIP client 222 and FTP client 224. It will be understood by those of skill in the art that mobile communication device 116 may include more applications or fewer applications. Although not specifically shown, the transport stack 206 may also be interfaced with the operating system of mobile communication device 116. In another implementation, the transport stack 206 may be provided as part of a data communications client module operable as a host-independent virtual machine on a mobile device.

The bottom layer (Layer 1) of the transport stack 206 is operable as an interface to the wireless network's packet layer. Layer 1 handles basic service coordination within the exemplary network environment 100 shown in FIG. 1A. For example, when mobile communication device 116 roams from one carrier network to another, Layer 1 verifies that the packets are relayed to the appropriate wireless network and that any packets that are pending from the previous network are rerouted to the current network. The top layer (Layer 4) exposes various application interfaces to the services supported on the mobile communication device. The remaining two layers of the transport stack 206, Layer 2 and Layer 3, are responsible for datagram segmentation/reassembly and security, compression and routing, respectively.

Mobile communication device 116 incorporates a QoS monitoring module 226 and a QoS modification module 228. It will be understood by those of skill in the art that the separate modules are depicted in this manner only for convenience, and that the functionality represented by these modules will generally be incorporated into one of the other modules depicted in FIG. 2. QoS monitoring module 226 incorporates the functionality to determine the current and immediate future QoS needs of mobile communication device 116. QoS modification module 228 incorporates the functionality to modify the QoS when needed. The manner of operation of each of QoS modules 226, 228 is discussed in further detail below.

Figure 3:
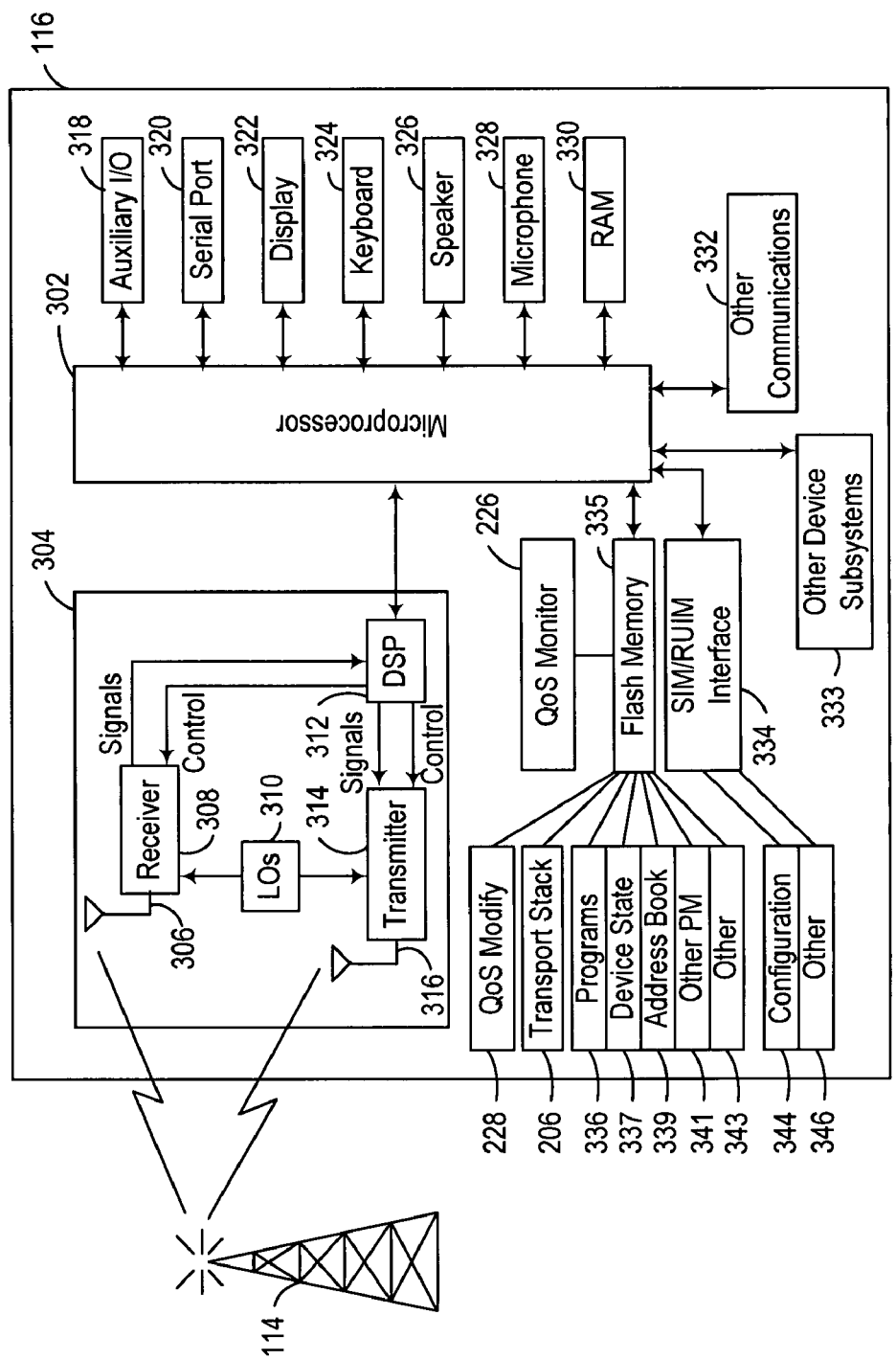
FIG. 3 depicts a block diagram of a mobile communication device operable to communicate within a wireless packet data service network according to one embodiment.

FIG. 3 depicts a block diagram of a mobile communication device according to one embodiment. It will be recognized by those skilled in the art upon reference hereto that although an embodiment of mobile communication device 116 may comprise an arrangement similar to one shown in FIG. 3, there can be a wide variety of variations and modifications, in hardware, software or firmware, with respect to the various modules depicted. Accordingly, the arrangement of FIG. 3 should be taken as illustrative-rather than limiting with respect to the embodiments of the present disclosure.

A microprocessor 302 providing for the overall control of an embodiment of mobile communication device 116 is operably coupled to a communication subsystem 304 which includes a receiver 308 and transmitter 314 as well as associated components such as one or more local oscillator (LO) modules 310 and a processing module such as a digital signal processor 312. As will be apparent to those skilled in the field of communications, the particular design of the communication module 304 may be dependent upon the communications network with which the mobile communication device 116 is intended to operate.

In one embodiment, the communication module 304 is operable with both voice and data communications. Regardless of the particular design, however, signals received by antenna 306 through base station 114 are provided to receiver 308, which may perform such common receiver functions as signal amplification, frequency down conversion, filtering, channel selection, analog-to-digital (A/D) conversion, and the like. Similarly, signals to be transmitted are processed, including modulation and encoding, for example, by digital signal processor 312, and provided to transmitter 314 for digital-to-analog (D/A) conversion, frequency up conversion, filtering, amplification and transmission over the air-radio interface via antenna 316.

Microprocessor 302 also interfaces with further device subsystems such as auxiliary input/output (I/O) 318, serial port 320, display 322, keyboard 324, speaker 326, microphone 328, random access memory (RAM) 330, a short-range communications subsystem 332, and any other device subsystems generally labeled as reference numeral 333. To control access, a Subscriber Identity Module (SIM) or Removable User Identity Module (RUIM) interface 334 is also provided in communication with the microprocessor 302.

In one implementation, SIM/RUIM interface 334 is operable with a SIM/RUIM card having a number of key configurations 344 and other information 346 such as identification and subscriber-related data. Operating system software and transport stack software may be embodied in a persistent storage module (i.e., non-volatile storage) such as flash memory 335. In one implementation, flash memory 335 may be segregated into different areas, e.g., storage area for computer programs 336 as well as data storage regions such as device state 337, address book 339, other personal information manager (PIM) data 341, and other data storage areas generally labeled as reference numeral 343. QoS monitor 226 and QoS modification module 228 are also shown disposed in flash memory 335, though those of skill in the art will appreciate that these components could be disposed in alternate locations.

Figure 4:
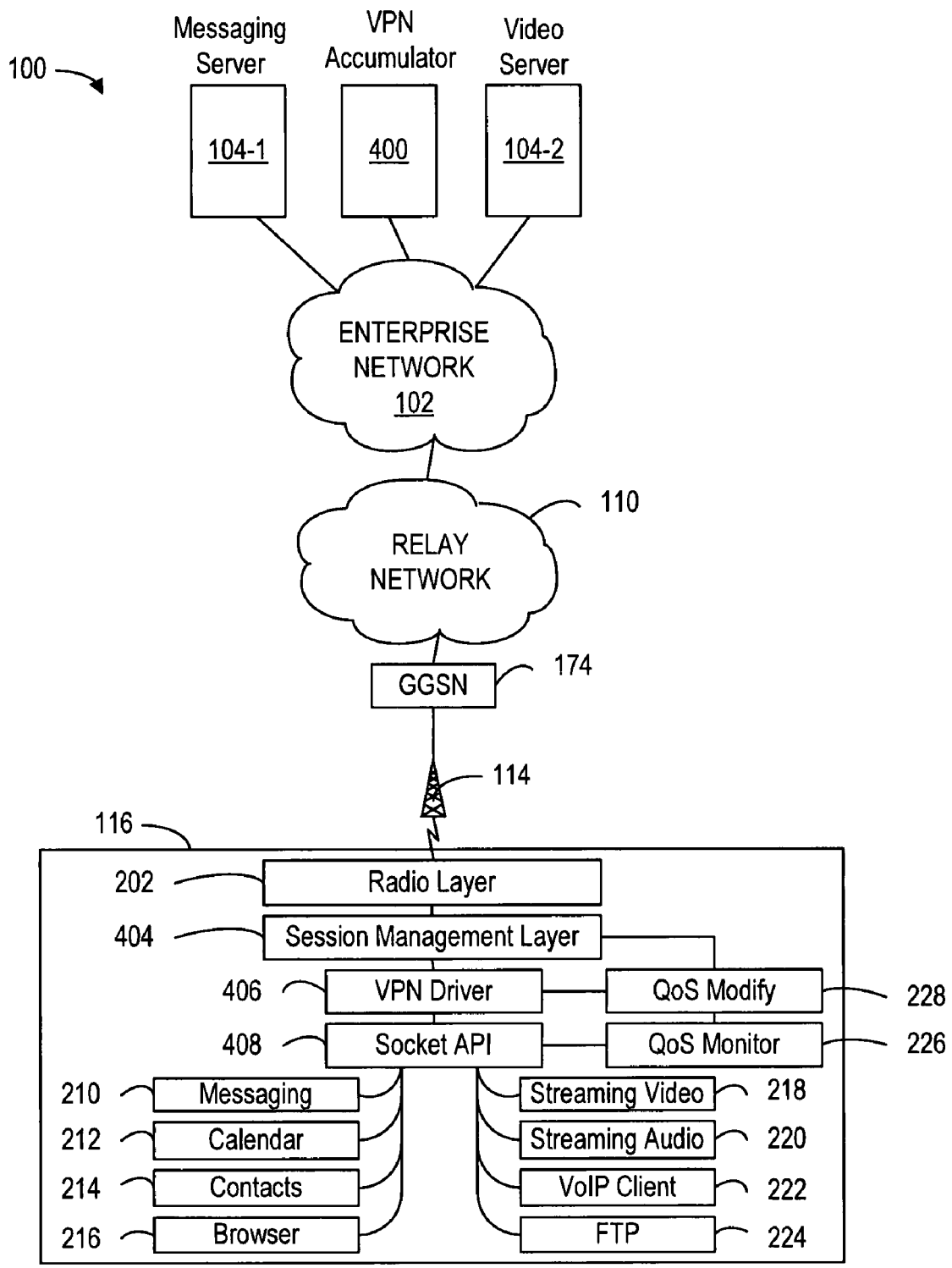
FIG. 4 depicts a schematic view of a wireless network operable to provide data service according to one embodiment.

FIG. 4 depicts a block diagram of network environment 100 focused on certain functional aspects of the architecture. While FIG. 4 and related figures explicitly relate to the use of a Virtual Private Network (VPN) as an example, those of skill in the art will appreciate that the arrangement and methodology disclosed therein is generally applicable to architectures employing a number of different types of secure communication channels, including but not limited to virtual private networks. Messaging server 104-1, streaming video server 104-2 and Virtual Private Network (VPN) accumulator 400 are shown in communication with enterprise network 102. Messaging server 104-1 and streaming video server 104-2 are tasked with running applications related to messaging and streaming video, respectively. VPN accumulator 400 is tasked with managing encryption and decryption of communications between enterprise network 102 and external devices, including mobile communication device 116. As discussed previously, enterprise network 102 is operably connected to trusted relay network 110, which is operably connected to mobile communication device 116 through GGSN 174 and base station 114.

Within mobile communication device 116, applications 208, which include messaging client 210, calendar client 212, contacts client 214, browser client 216, streaming video client 218, streaming audio client 220, VoIP client 222 and FTP client 224, are operably connected to session management (SM) layer 404 via socket application programming interface (API) 408 and virtual private network (VPN) driver 406. SM layer 404, in turn, communicates with base station 114 via radio layer 202.

QoS monitor module 226 and QoS modify module 228 are operably connected to SM layer 404, VPN driver 406 and socket API 408, as well as to one another. In certain embodiments, all or a portion of these modules may be disposed within transport stack 206 described above. In alternate embodiments, all of these modules may be disposed external to transport stack 206. Those of skill in the art will appreciate that the above-described modules are intended to represent particular functions, and the functions represented may be embodied within more or fewer logic modules in a given application. The interaction and functional behavior of these modules is described in detail in connection with FIG. 5, below.

Figure 5:
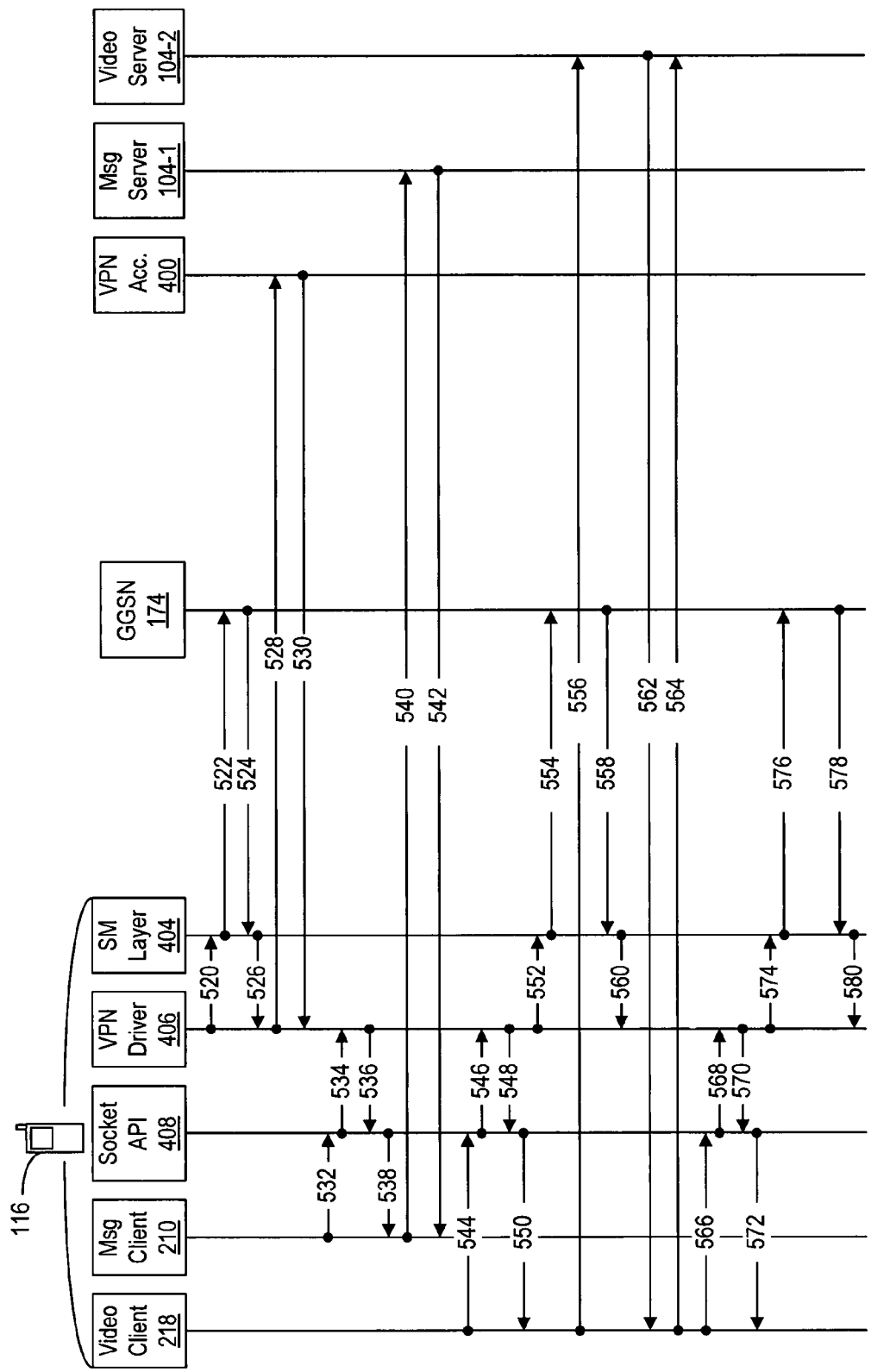
FIG. 5 depicts a message flow diagram according to one embodiment of the present disclosure.

FIG. 5 depicts a message flow diagram according to one embodiment. Mobile communication device 116 is in secure communication, via a secure tunnel, with enterprise network 102 and running a set of applications, including messaging client 210 and streaming video client 218. It will be understood by those of skill in the art that applications 210, 218 are presented only as examples of applications requiring significantly different qualities of service, with messaging requiring a relatively low QoS, and streaming video requiring a relatively high QoS. At a certain point in time VPN driver 406 contacts GGSN 174 in order to establish a virtual private network (VPN) with enterprise network 102. This communication is represented by message 520 from VPN driver 406 to session management layer 404, message 522 from session management layer 404 to GGSN 174, message 524 from GGSN 174 to session management layer 404 and message 526 from session management layer 404 to VPN driver 406. As part of this initial handshaking, session management layer 404 will request a certain default quality of service (QoS). In order to conserve limited resources, the default QoS may provide for a limited bandwidth or relatively high latency, generally suitable for text messaging and perhaps limited or asynchronous audio communications, but generally not suitable for higher bandwidth applications such as streaming audio and/or streaming video or for low latency applications such as VoIP. Accordingly, the default QoS may not be suitable for all communications between mobile communication device 116 and enterprise network 102. Alternately, the default QOS may be relatively high, but may overkill for low-bandwidth applications, in which case a different QoS may be more appropriate when the default QoS is not necessary.

After initial handshaking with GGSN 174 is complete, mobile communication device 116 can contact enterprise network 102 via VPN accumulator 400 in order to establish the secure communications tunnel. This communication is represented by message 528 from VPN driver 406 to VPN accumulator 400 and message 530 from VPN accumulator 400 to VPN driver 406. After this handshaking process is complete, communications between mobile communication device 116 and enterprise network 102 will be encrypted between VPN driver 406 and VPN accumulator 400. This means that GGSN 174 and other nodes along the communication path between mobile communication device 116 and enterprise network 102 will not have access to the content of the communications between mobile communication device 116 and enterprise network 102. GGSN 174 will not, therefore, have access to sufficient information to modify the QoS provided to mobile communication device 116 in order to provide an optimal level of service to mobile communication device 116. If the communications between mobile communication device 116 and enterprise network 102 were not encrypted, GGSN 174 would be able to identify when the nature of the communications between mobile communication device 116 and enterprise network 102 are such that a higher QoS is necessary. Owing to the fact that these communications are encrypted, GGSN 174 has no such ability to monitor the type of communications being shared and to adjust the QoS as necessary.

In order to allow for a dynamic QoS capable of being adjusted on demand, the present disclosure provides for additional functionality within mobile communication device 116 suitable for requesting a different QoS when suitable and for returning to the default QOS when the default QOS is more suitable. In the embodiment shown in FIG. 5, VPN driver 406 is operable to open multiple sockets within the secure tunnel as necessary, to close sockets as appropriate, and to modify the QoS provided to mobile communication device 116 as required by the demands of the applications running on mobile communication device 116.

Subsequent to the establishment of the secure tunnel between mobile communication device 116 and enterprise network 102, messaging client 210 requests a socket via VPN driver 406. This is represented by message 532 from messaging client 210 to socket API 408 and message 534 from socket API 408 to VPN driver 406. Upon receipt of the request, VPN driver 406 compares the details of the socket request to the current QoS provided by GGSN 174. If VPN driver 406 determines that a different QoS is suitable, VPN driver 406 can request a different QoS from GGSN 174. If VPN driver 406 determines that a different QoS is not suitable, VPN driver 406 will not request a different QoS from GGSN 174. In the present case, VPN driver 406 has determined that the service demands of messaging client 210 fit within the presently provided QoS. Accordingly, VPN driver 406 will not request a different QoS from GGSN 174. VPN driver 406 acknowledges the request as represented by message 536 from VPN driver 406 to socket API 408 and message 538 from socket API 408 to messaging client 210. Once the socket is opened, messaging client 210 and messaging server 104-1 can communicate, as represented by message 540 from messaging client 210 to messaging server 104-1 land message 542 from messaging server 104-1 to messaging client 210.

Subsequently, streaming video client 218 requests a socket from VPN driver 406. This is represented by message 544 from streaming video client 218 to socket API 408 and message 546 from socket API 408 to VPN driver 406. In this case, based on the characteristics of the request, VPN driver 406 will determine that a different QoS is stet in order to conduct this communication. In this case, a higher QOS is required. This may be, for example, a request for a socket suitable for VoIP or streaming video. It will be clear to those of skill in the art that a wide variety of communication types might require a different QoS than that required for messaging or browsing.

Whatever the details of the communication, VPN driver 406 will need to request the modified QoS from GGSN 174 in order to open a socket having the requested characteristics. VPN driver 406 first acknowledges the socket open request from streaming video client 218, as represented by message 548 from VPN driver 406 to socket API 408 and message 550 from socket API 408 to streaming video client 218. Then, VPN driver 406 requests the modified QoS from GGSN 174, as represented by message 552 from VPN driver 406 to session management layer 404 and message 554 from session management layer 404 to GGSN 174.

In certain cases, the communication between mobile communication device 116 and enterprise network 102 may be initiated prior to the acknowledgment, by GGSN 174, of the modified QoS. This is represented by message 556 from streaming video client 218 to streaming video server 104-2. Subsequent to the initiation of the communication, GGSN 174 modifies the QoS and acknowledges the modification to mobile communication device 116, as represented by message 558 from GGSN 174 to session management layer 404 and message 560 from session management layer 404 to VPN driver 406.

Having established a secure channel having an acceptable QoS for streaming video traffic, streaming video server 104-2 and streaming video client 218 conduct a streaming video session, as represented by message 562 from streaming video server 104-2 to streaming video client 218 and message 564 from streaming video client 218 to streaming video server 104-2. Once the streaming video session is complete, streaming video client 218 notifies VPN driver 406, via socket API 408, that the enhanced QoS is no longer necessary. This is represented by message 566 from streaming video client 218 to socket API 408 and message 568 from socket API 408 to VPN driver 406. VPN driver 406 then acknowledges the notification, as represented by message 570 from VPN driver 406 to socket API 408 and message 572 from socket API 408 to streaming video client 218.

After receiving the notification of reduced QoS requirements, VPN driver 406 notifies GGSN 174 of the reduced requirement, as represented by message 574 from VPN driver 406 to session management layer 404 and message 576 from session management layer 404 to GGSN 174. GGSN 174 then acknowledges the notification, as represented by message 578 from GGSN 174 to session management layer 404 and message 580 from session management layer 404 to VPN driver 406.

Figure 6:
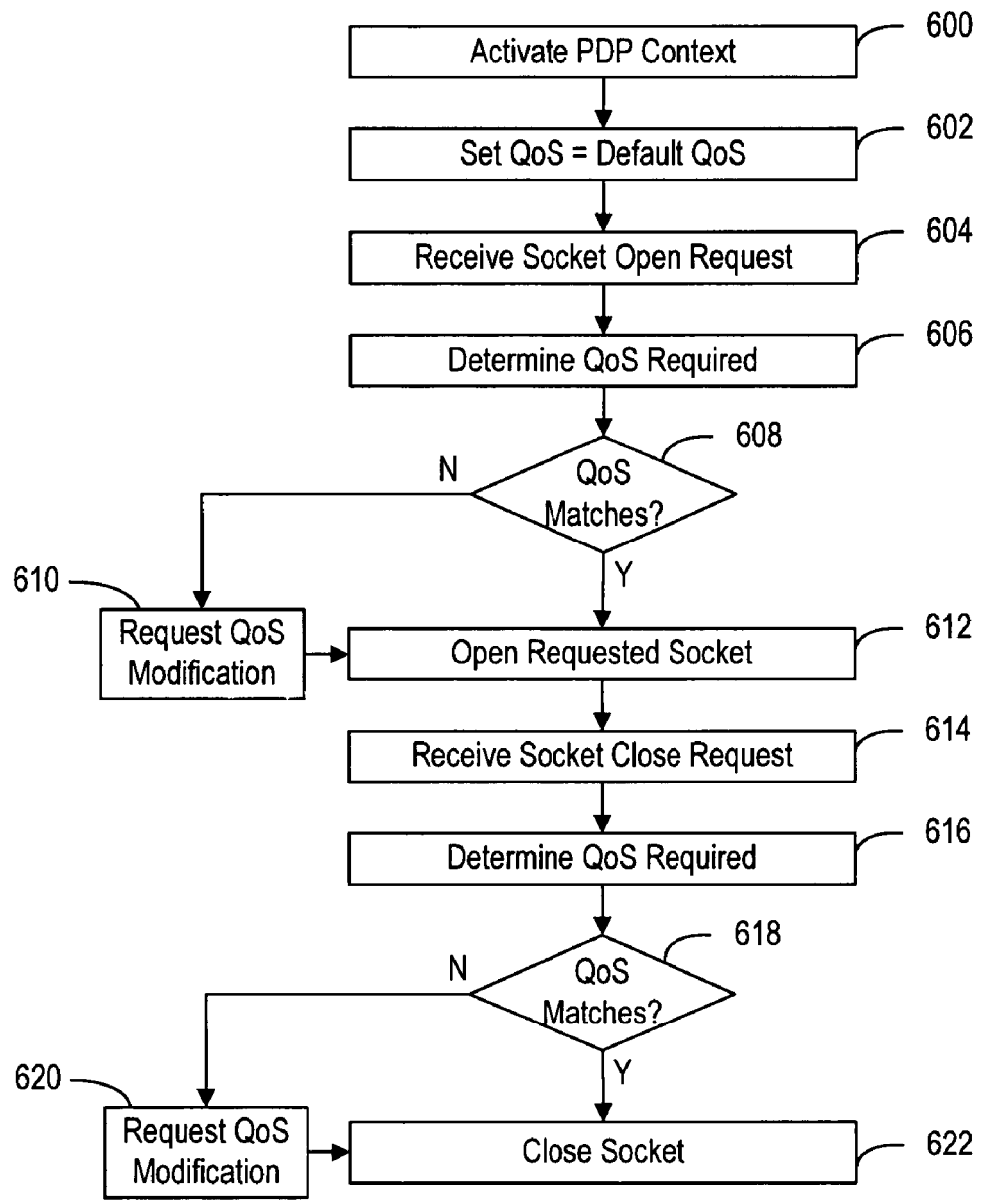
FIG. 6 depicts a flow chart illustrating a method for dynamic quality of service (QoS) management according to one embodiment.

FIG. 6 illustrates, in flow chart form, the communication patterns shown in FIG. 5. Process flow begins in block 600, wherein a PDP context is activated. In block 602, the QoS for this PDP context is set to a default QoS. In block 604, a socket open request is received from an application.

In block 606, the most suitable QoS is determined. Process flow from decision block 608 depends upon whether there is a match between the QoS most suitable and the QoS provided. If there is a mismatch, process flow proceeds to block 610, wherein a QoS modification is requested. If there is not a mismatch, process flow proceeds directly to block 612, where the requested socket is opened.

At a later point in time, a request is received to close the socket, as represented by block 614. The QoS that will be required once the socket is closed is determined in block 616. Process flow from decision block 618 depends on whether there is a match between the resources which will be most suitable after the socket is closed and the current resources provided. If there is a mismatch between the suitable resources and the resources provided, process flow proceeds to block 620, where a QoS modification is requested. If there is not a mismatch, process flow proceeds directly to block 622, where the socket is closed.

It is believed that the operation and construction of the embodiments of the present disclosure will be apparent from the Detailed Description set forth above. As noted above, while the foregoing disclosure explicitly relates to the use of a Virtual Private Network (VPN) as an example, those of skill in the art will appreciate that the arrangement and methodology disclosed therein is generally applicable to architectures employing a number of different types of secure communication channels, including but not limited to virtual private networks. While the exemplary embodiments shown and described may have been characterized as being preferred, it should be readily understood that various changes and modifications could be made therein without departing from the scope of the present disclosure as set forth in the following claims.

What is claimed is:

1. A mobile communication device comprising:
a virtual private network driver operable to establish a secure channel between the mobile communication device and a remote network via a wireless network, and to open and close multiple sockets within an end-to-end secure tunnel supported by the secure channel;
a first client application operable to communicate with a first server application via the secure tunnel utilizing a first socket operable from the virtual private network driver and associated with a first quality of service;
a second client application operable to communicate with a second server application via the secure tunnel utilizing a second socket operable from the virtual private network driver and associated with a second quality of service different from the first quality of service;
a quality of service monitor operable to compare the second quality of service with the first quality of service to identify when the second quality of service is appropriate wherein the quality of service monitor is integrated with the virtual private network driver; and
a quality of service modification module operable to request the second quality of service from the wireless network responsive to the quality of service monitor identifying when the second quality of service is appropriate to support service demands of the second client application.

2. The mobile communication device as recited in claim 1 wherein the first client application is one of a messaging client application, a contacts management client application, a calendar management application or a browser application.

3. The mobile communication device as recited in claim 1 wherein the second application is one of a streaming audio client, a streaming video client, a VoIP client or an FTP client.

4. The mobile communication device as recited in claim 1 wherein the wireless network is one of a GSM network, an Enhanced Data Rates for GSM Evolution (EDGE) network, an Integrated Digital Enhanced Network (IDEN), a Universal Mobile Telephone System (UMTS) network, a Code Division Multiple Access (CDMA) network or a 3rd Generation (3G) network.

5. The mobile communication device as recited in claim 1 wherein the quality of service monitor is further operable to identify when the second quality of service is not appropriate.

6. The mobile communication device as recited in claim 5 wherein the quality of service modification module is operable to request the first quality of service from the wireless network when the second quality of service is not appropriate.

7. The mobile communication device as recited in claim 1 wherein the quality of service monitor and quality of service modification module comprise a portion of a transport stack within the mobile communication device.

8. The mobile communication device as recited in claim 1 wherein the quality of service modification module is integrated with the virtual private network driver.

9. A method of dynamically modifying the quality of service provided to a mobile communication device comprising a virtual private network driver operable to establish a secure channel between the mobile communication device and a remote network via a wireless network, and to open and close multiple sockets within an end-to-end secure tunnel supported by the secure channel, the method comprising:
communicating with a first server application via the secure tunnel utilizing a first quality of service operable through a first socket within the secure tunnel established between the mobile communication device and a remote network through a wireless network;
requesting a second socket within the secure tunnel for communicating with a second server application via the secure tunnel, the second server application associated with a second quality of service different from the first quality of service;
comparing by a quality of service monitor the second quality of service with the first quality of service to determine that the second quality of service is appropriate, wherein the quality of service monitor is integrated with the virtual private network driver; and
requesting, from a network node associated with the wireless network, the second quality of service for communicating with the second server application via the second socket within the secure tunnel when the second quality of service is determined to be appropriate.

10. The method of dynamically modifying the quality of service provided to a mobile communication device as recited in claim 9 wherein the first quality of service is associated with one of a messaging client application, a contacts management client application, a calendar management application or a browser application.

11. The method of dynamically modifying the quality of service provided to a mobile communication device as recited in claim 9 wherein the second quality of service is associated with one of a streaming audio client, a streaming video client, a VoIP client or an FTP client.

12. The method of dynamically modifying the quality of service provided to a mobile communication device as recited in claim 9 wherein the wireless network is one of a GSM network, an Enhanced Data Rates for GSM Evolution (EDGE) network, an Integrated Digital Enhanced Network (IDEN), a Universal Mobile Telephone System (UMTS) network, a Code Division Multiple Access (CDMA) network or a 3rd Generation (3G) network.

13. The method of dynamically modifying the quality of service provided to a mobile communication device as recited in claim 9 further comprising the step of identifying when the second quality of service is not appropriate.

14. The method of dynamically modifying the quality of service provided to a mobile communication device as recited in claim 13 further comprising the step of requesting the first quality of service from the wireless network when the second quality of service is not appropriate.

15. The method of dynamically modifying the quality of service provided to a mobile communication device as recited in claim 9 wherein the step of requesting, from a network node associated with the wireless network, the second quality of service is performed by a quality of service modification module.

16. The method of dynamically modifying the quality of service provided to a mobile communication device as recited in claim 15 wherein the quality of service modification module is integrated with the virtual private network driver.

\* \* \* \* \*